US006052715A

United States Patent [19]

Fukui et al.

[11] Patent Number: 6,052,715

[45] Date of Patent: Apr. 18, 2000

[54] INTERACTIVE COMMUNICATION SYSTEM FOR DOWNLOADING LARGE AMOUNT DATA

[75] Inventors: Takayoshi Fukui, Hamura; Masayasu Miyake, Fuchu, both of Japan

[73] Assignee: Casio Computer Co., Ltd., Tokyo, Japan

[21] Appl. No.: 08/855,455

[22] Filed: May 13, 1997

[30] Foreign Application Priority Data

May 16, 1996 [JP] Japan .................................... 8-122057

[51] Int. Cl.[7] ............................. H04H 1/00; H04N 7/173

[52] U.S. Cl. ............................................... 709/217; 348/12

[58] Field of Search ............................... 348/6, 7, 10, 12, 348/13; 455/3.1, 3.2, 4.1, 4.2, 6.1, 6.2, 5.1; 709/217–219

[56] References Cited

U.S. PATENT DOCUMENTS 5,177,604 1/1993 Martinez .
5,321,514 6/1994 Martinez .
5,347,304 9/1994 Moura et al. ............................. 348/12
5,761,602 6/1998 Wagner et al. .......................... 455/3.1

*Primary Examiner*—Nathan Flynn
*Attorney, Agent, or Firm*—Frishauf, Holtz, Goodman, Langer & Chick, P.C.

[57] ABSTRACT

An information terminal transmits small amount data such as a command to a Web server on the internet to an asymmetric router via an interactive radio network. The asymmetric router transmits the command to the Web server via the internet. The asymmetric router transmits large amount data (for example, HTML formatted browser data) from the Web server to a data superimposing broadcast apparatus. The data superimposing broadcast apparatus determines a scheduled time of broadcasting according to a data amount. The scheduled time is transmitted to the information terminal via the asymmetric router and the interactive radio network. When the scheduled time comes, the large amount data is superimposed on an empty portion of a television signal, and is broadcasted. The information terminal carries out a predetermined processing operation whereby a broadcast receiving circuit is turned on, and the television signal on which the large amount data has been superimposed is received. The received data then can be displayed in a display device and the like. Therefore, even in a portable information terminal, it is possible to provide an interactive communication system which can transmit large amount data at a high speed.

13 Claims, 14 Drawing Sheets

1
INFORMATION TERMINAL
2
INTERRACTIVE RADIO NETWORK
3
DATA SUPERIMPOSING BROADCAST APPARATUS
4
ASYMMETRIC ROUTER
5 INTERNET
6
SERVER
7 FIXED NETWORK
8
VALUE ADDED NETWORK

1
INFORMATION TERMINAL
BROADCAST RECEIVING CIRCUIT
INTERACTIVE TRANSMITTING/ RECEIVING CIRCUIT
1b
1a
2
INTERACTIVE RADIO NETWORK
3
DATA SUPERIMPOSING BROADCAST APPARATUS
4
ASYMMETRIC ROUTER
5
WEB SERVER
CMD
CMD
CMD
D1
CRQ
ACK
D1
TT
C,TT
C,TT
C,TT
D1
TRANSMIT SCHEDULED TIME
ACK
ACK
ACK
ERASE D1

ASYMMETRIC ROUTER
4
K2
CERTIFYING CENTER
30
(K2)
DATA SUPERIMPOSING BROADCAST APPARATUS
3
INTERACTIVE RADIO NETWORK
2
K1
ENCRYPTING/ DECRYPTING CIRCUIT
31
(K2)
1
BROADCAST RECEIVING CIRCUIT
1b
1j
K2
DECRYPTING CIRCUIT
INTERACTIVE TRANSMITTING/ RECEIVING CIRCUIT
1a
1i
K1
ENCRYPTING/ DECRYPTING CIRCUIT
K2
CONTROL PORTION
1f

70
PREAMPLE/
TIME
MARKER
71
SIGNAL
DISTRIBUTION CODE
(LENGTH OF
EACH DATA)
80
DATA
90
PREAMPLE
90a
DATA
90b
100
PREAMPLE
100a
DATA
100b
60

INTERACTIVE COMMUNICATION SYSTEM FOR DOWNLOADING LARGE AMOUNT DATA

BACKGROUND OF THE INVENTION

The present invention relates to an interactive communication system which transmits/receives data at a high speed using an existing communication system.

This application is based on Japanese Patent Application No.08-122057, filed May 16, 1996, the contents of which are incorporated herein by reference.

Recently, the internet (which uses a general analog telephone line) or a digital private line has become widely known as an interactive communication system. Using the internet, HTML (i.e., Hypertext Markup Language) formatted data (a document comprising an image, a sound and a character or text) can be browsed, and a number of large amount data which are stored in servers distributed all over the world can be received.

For interactive communication, there exists a usual television broadcast system for unidirectionally transmitting images and sound to a user over a plurality of channels. In a television broadcast, an empty portion of a television signal is used so that a character information (character broadcast) is transmitted by a plurality of channels. The television broadcast thus provides a communication system which can transmit a large amount of information to the user.

Furthermore, as an interactive communication system for transmitting/receiving more information between a plurality of users, there is such an interactive communication system as VOD (Video On Demand) using a private communication line network in which an up link/down link is provided in a CATV (cable television) system so that the interactive communication can be carried out.

In the case of accessing the internet using a fixed terminal, for example, a computer and the like provided at home or in an office, data can be transmitted at a high speed. However, in the case of using a portable type information terminal (a mobile terminal) carried by the user, since the data is transmitted via a relay station (a base station of the interactive communication network), a maximum data transfer rate is about 9.6 kbps. For example, the portable information terminal is used so as to access a WWW (World Wide Web) server on the internet and to browse HTML formatted data (i.e., documents comprising image, sound and character data). In this case, when the data of 150 kbytes is received, it takes about 15 seconds, and there is a problem in that the data transfer rate is too slow and is not practical.

In Europe, in a ground wave digital broadcast which is put to practical use as a television broadcast, a mobile communication which can realize a transfer rate of about 1 Mbps forms a part of the service. In the case of using this communication system, in the above example, the data can be received in about 2 seconds. However, in the television broadcast and the ground digital broadcast, even if the data can be transmitted at the high speed, the user can only receive the data. Thus, there is such a problem in that interactive communication cannot be carried out.

Furthermore, in such an interactive communication system as CATV using a private line, service cannot be provided to the user at an optional place (i.e., such as in a train, a hall or a conference center). In other words, CATV can be provided to the user only at a specific place. Thus, there is a problem in that thus service cannot be provided for a mobile type information terminal.

BRIEF SUMMARY OF THE INVENTION

Therefore, it is an object of the present invention to provide an interactive communication system which can transmit large amount data at a high speed to an information terminal, and more specifically, to a portable information terminal.

According to a first aspect of the present invention, there is provided an interactive communication system comprising:

an interactive communication system in which data is transmitted/received between a host terminal and a terminal;

a large amount data transmitting system for unidirectionally transmitting a large amount data to the host terminal; and a system switching apparatus for supplying data transmitted from the interactive communication system to the large amount data transmitting system so as to transmit the data to the host terminal via the large amount data transmitting system.

According to a second aspect of the present invention, there is provided an interactive communication system as recited in the first aspect in which the large amount data transmitting system comprises a broadcasting system for broadcasting a predetermined television signal, and when data is transmitted from the system switching apparatus, the data is superimposed to the television signal so that the data is broadcasted.

According to a third aspect of the present invention, there is provided an interactive communication system as recited in the first aspect in which the system switching apparatus, based on a data amount to be transmitted, selectively switches either the interactive communication system or the large amount data transmitting system for using as a data transmission channel.

According to a fourth aspect of the present invention, there is provided an interactive communication system as recited in the first aspect in which the large amount data transmitting system comprising:

storage means for temporarily storing transmitted data;

transmitting-scheduled time determining means for determining a scheduled time of broadcasting based on at least the data amount to be transmitted; and transmitting means for transmitting the data stored in the storage means when the scheduled time of broadcasting determined by the transmitting-scheduled time determining means comes.

According to a fifth aspect of the present invention, there is provided an interactive communication system as recited in the fourth aspect in which the large amount data transmitting system supplies the scheduled time of broadcasting determined by the transmitting-scheduled time determining means to the host terminal via the interactive communication system; and the host terminal receives the scheduled time of broadcasting supplied from the interactive communication system, and when the scheduled time of broadcasting comes, the data from the large amount data transmitting system is received.

According to a sixth aspect of the present invention, there is provided an interactive communication system as recited in the first aspect in which the large amount data transmitting system comprises plural data transmitting devices which are located in each predetermined area; and the system switching apparatus temporarily stores supplied data, stored data being transmitted to one of the data transmitting devices located in an area corresponding to a position information of the host terminal.

According to a seventh aspect of the present invention, there is provided an interactive communication system as recited in the first aspect in which the system switching apparatus performs a predetermined encryption using a predetermined encrypting key relative to data to be transmitted to the large amount data transmitting system; and the host terminal decrypts encrypted large amount data transmitted from the large amount data transmitting system by using the predetermined encrypting key.

According to an eighth aspect of the present invention, there is provided an interactive communication system as recited in the seventh aspect in which the host terminal obtains the predetermined encryption key via the interactive communication system prior to a reception of the large amount data.

According to an ninth aspect of the present invention, there is provided an interactive communication system as recited in the first aspect in which the interactive communication system and the host terminal perform a predetermined encryption using a predetermined encrypting key relative to data to be transmitted/received, and encrypted data is decrypted by using the predetermined encrypting key.

According to a tenth aspect of the present invention, there is provided an interactive communication system as recited in the first aspect in which the host terminal comprises a plurality of server terminals for providing an HTML formatted file; and the system switching apparatus browses the HTML formatted file provided by a predetermined server terminal on internet according to a command supplied from the server terminal via the interactive communication system, the HTML formatted file being converted into a display format data suitable for the server terminal so that the display format data is transmitted to the large amount data transmitting system.

According to an eleventh aspect of the present invention, there is provided an interactive communication system as recited in the sixth aspect in which the large amount data transmitting system transmits a communication information indicative of the interactive communication system which can be used in each area by the host terminal; and the host terminal selects the interactive communication system to be used according to the communication information from the large amount data transmitting system.

According to a twelfth aspect of the present invention, there is provided an interactive communication system as recited in the first aspect in which the large amount data transmitting system transmits an identification code for specifying the host terminal by which the data is to be received for the data supplied from the system switching apparatus so as to transmit the data; and the terminal determines whether or not the identification code provided for the data supplied from the large amount data transmitting system corresponds to the identification code which is preset to the identification code itself, the data being received only if a correspondence is detected.

According to a thirteenth aspect of the present invention, there is provided an interactive communication system as recited in the first aspect in which the host terminal supplies a position information indicative of a present position to the interactive communication system at a predetermined timing;

the system switching apparatus transmits the position information of the information terminal provided via the interactive communication system to the large amount data transmitting system; and the large amount data transmitting system comprises a plurality of transmitting antennas having a different directivity, the data being transmitted from data transmission antenna having the corresponding directivity to the position information among the plurality of transmitting antennas.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 11 is a block diagram showing a constitution of the information terminal comprising a conventional personal computer and the like;

DETAILED DESCRIPTION OF THE INVENTION

A preferred embodiment of an interactive communication system according to the present invention will now be described with reference to the accompanying drawings.

Embodiments according to the present invention will be described below as an embodiments applied to internet and a value added network (VAN).

(A) First Embodiment (A-1) Constitution of an Interactive Communication System

Figure 1:
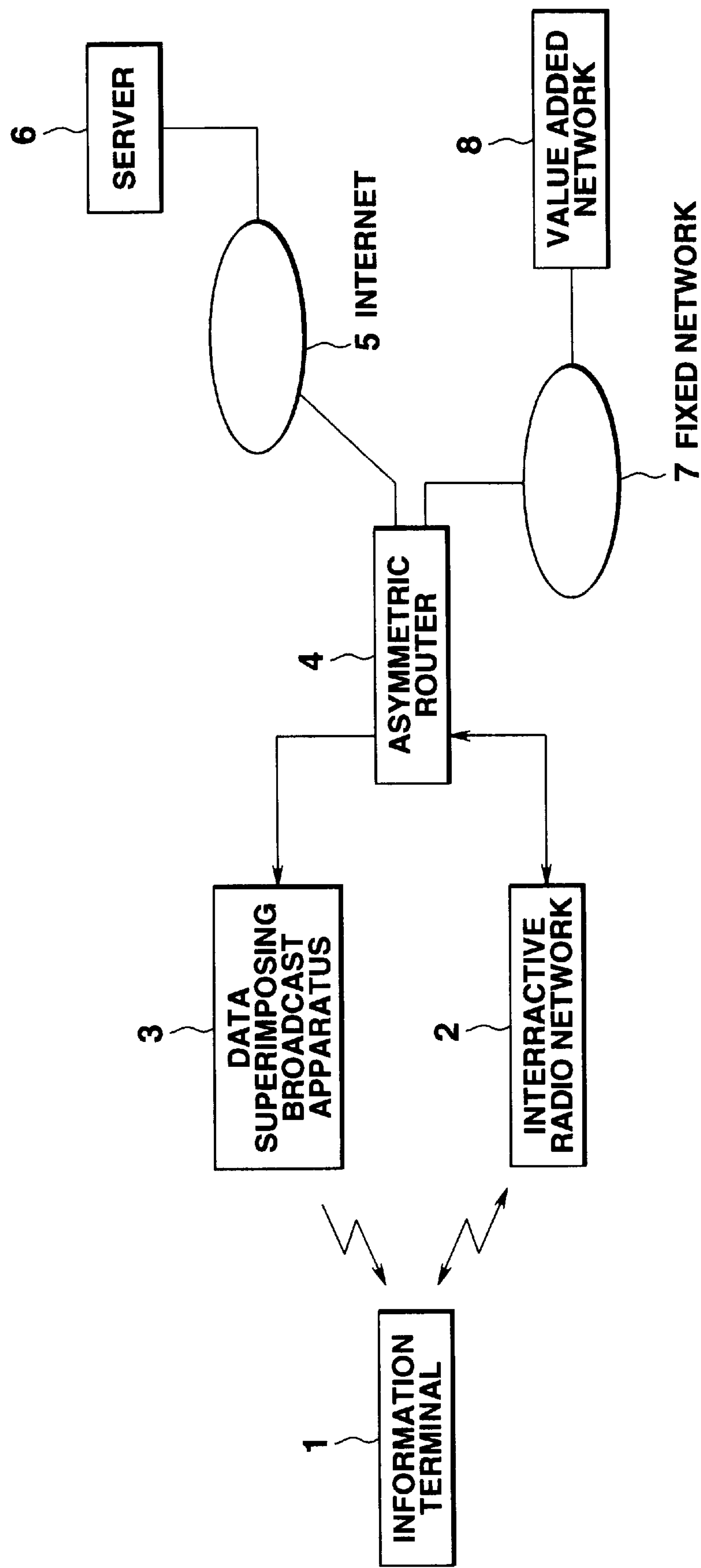
FIG. 1 is a block diagram showing a constitution of an interactive communication system according to a first embodiment of the present invention.

FIG. 1 is a block diagram showing a constitution of an interactive communication system according to a first embodiment of the present invention. In FIG. 1, an information terminal 1 is carried by a user (not shown). The information terminal 1 comprises a key input device (not shown) for inputting an instruction from the user, a display device for displaying various data (image, character and the like) and the like. Furthermore, the information terminal 1 comprises a transmission/reception function for transmitting/receiving the data between the transmission/reception function and an interactive radio network 2 described below and a broadcast reception function for receiving the data from a data superimposing broadcast apparatus 3. The information terminal 1 carries out a usual interactive communication with the interactive radio network 2, whereby the information terminal 1 transmits/receives, via the interactive radio network 2, the data (small amount) such as a command, to/from a server 6 on an internet 5 and a value added network 8 on a fixed network 7 described above. Furthermore, the information terminal 1 receives the data (large amount) from the server 6 on internet 5 and the value added network 8 on the fixed network 7 via the data superimposing broadcast apparatus 3.

The interactive radio network 2 is a radio network which can perform the interactive communication with the information terminal 1 by radio. For example, the interactive radio network 2 is a communication network formed of base stations provided for each area which can be covered with a radio signal of a predetermined output level such as the communication network for a portable telephone, a PHS and the like. The interactive radio network 2 transmits the small amount data received from the information terminal 1 by radio to an asymmetric router 4 described later. Furthermore, the interactive radio network 2 transmits the small amount data from the asymmetric router 4 to the information terminal 1 by radio.

The data superimposing broadcast apparatus 3 is only unidirectional (transmitting). The data superimposing broadcast apparatus 3 is an apparatus for superimposing a predetermined large amount data from the asymmetric router 4 to a usual broadcasting signal and for transmitting the broadcasting signal. For example, the data superimposing broadcast apparatus 3 is a television broadcasting station for superimposing the large amount data provided from the asymmetric router 4 to the television signal such as a character broadcast and for broadcasting the television signal from a broadcasting tower or antenna (not shown). The data superimposing broadcast apparatus 3 may be a usual analog television broadcasting station or may be a digital television broadcasting station adopted in Europe as described above.

The asymmetric router 4 transmits the small amount data transmitted from the interactive radio network 2 to a predetermined server 6 on internet (a private line or an analog line) 5 described below and to the value added communication network 8 via the fixed network (the private line or the analog line) 7. The asymmetric router 4 transmits the large amount data transmitted from the server 6 on internet 5 and the value added communication network on the fixed network 7 to the data superimposing broadcast apparatus 3.

Internet 5 is the communication network in which computers (servers) of various organizations and individuals all over the world are connected to one another. Internet 5 is directly connected to the asymmetric router 4 or is connected to the asymmetric router 4 through the private line or the usual analog line via a provider. The server 6 is a WWW (World Wide Web) server (hereinafter referred to as a Web server) for providing an HTML formatted data (a document comprising the image, a sound and the character) and the server for providing various news and data. Furthermore, the fixed network 7 is the private line or the analog line connected to the value added network 8 for providing various information, and it is directly connected to the asymmetric router 4.

(A-2) Data Superimposing Broadcast Apparatus

Figure 2:
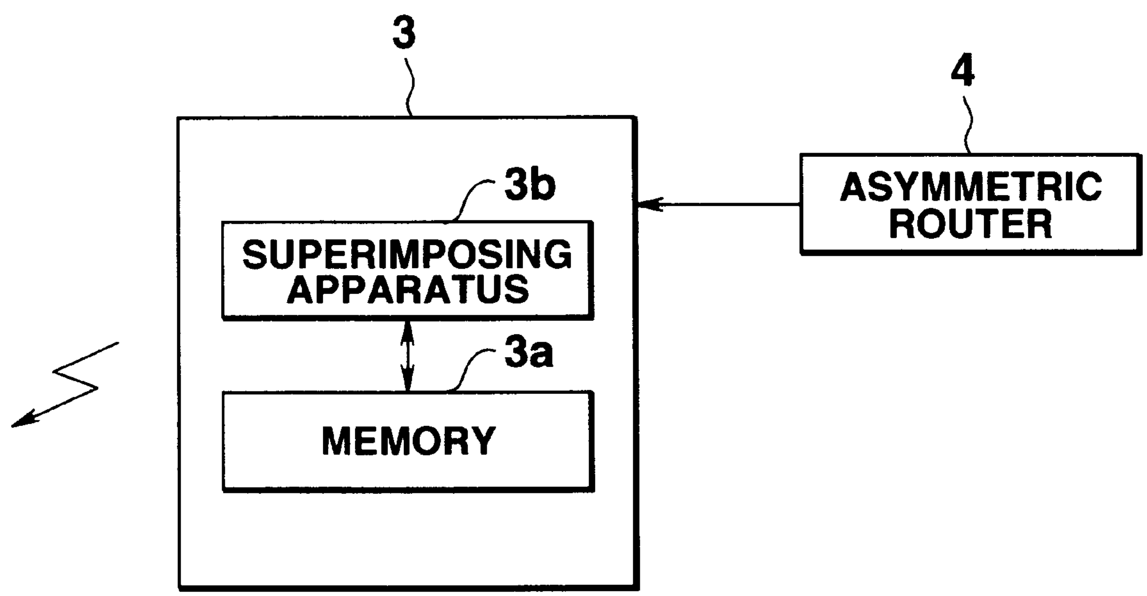
FIG. 2 is a block diagram showing a general constitution of a data superimposing broadcast apparatus according to the first embodiment of the present invention.

FIG. 2 is a block diagram showing a general constitution of the data superimposing broadcast apparatus 3. The data superimposing broadcast apparatus 3 comprises a memory **3*a* for temporarily storing the large amount data transmitted from the asymmetric router 4 and a superimposing apparatus 3*b* for superimposing the large amount data stored in the memory 3*a* to the television signal at a predetermined timing (scheduled time of broadcasting) and for transmitting the television signal. If the asymmetric router 4 issues a data transmission request, the data superimposing broadcast apparatus 3 supplies data indicating an idle channel to the asymmetric router 4, temporally stores the received large amount data in the memory 3*a*, and determines the scheduled time of broadcasting for transmitting the large amount data to the information terminal 1 according to a data amount and the transmission request. Then, the data indicating scheduled time of broadcasting is returned to the asymmetric router 4. At the scheduled time of broadcasting, the large amount data stored in the memory 3*a* is superimposed to the television signal by the superimposing apparatus 3*b*** and is transmitted.

In order to determine the scheduled time of broadcasting, for example, a FIFO system for transmitting the data in an order of the previously received data and such a system that a priority order is combined to this order so as to determine a transmission order are preferable. Furthermore, when a simulcast is previously scheduled, the scheduled time of broadcasting may be determined to avoid the simulcast timing. Furthermore, the data stored in the memory **3*a* is prepared for a re-transmission, and the data is maintained even after the transmission. The data is erased when an ACK signal transmitted from the information terminal 1 is received via the asymmetric router 4** or a predetermined time passes.

(A-3) Information Terminal

Figure 3:
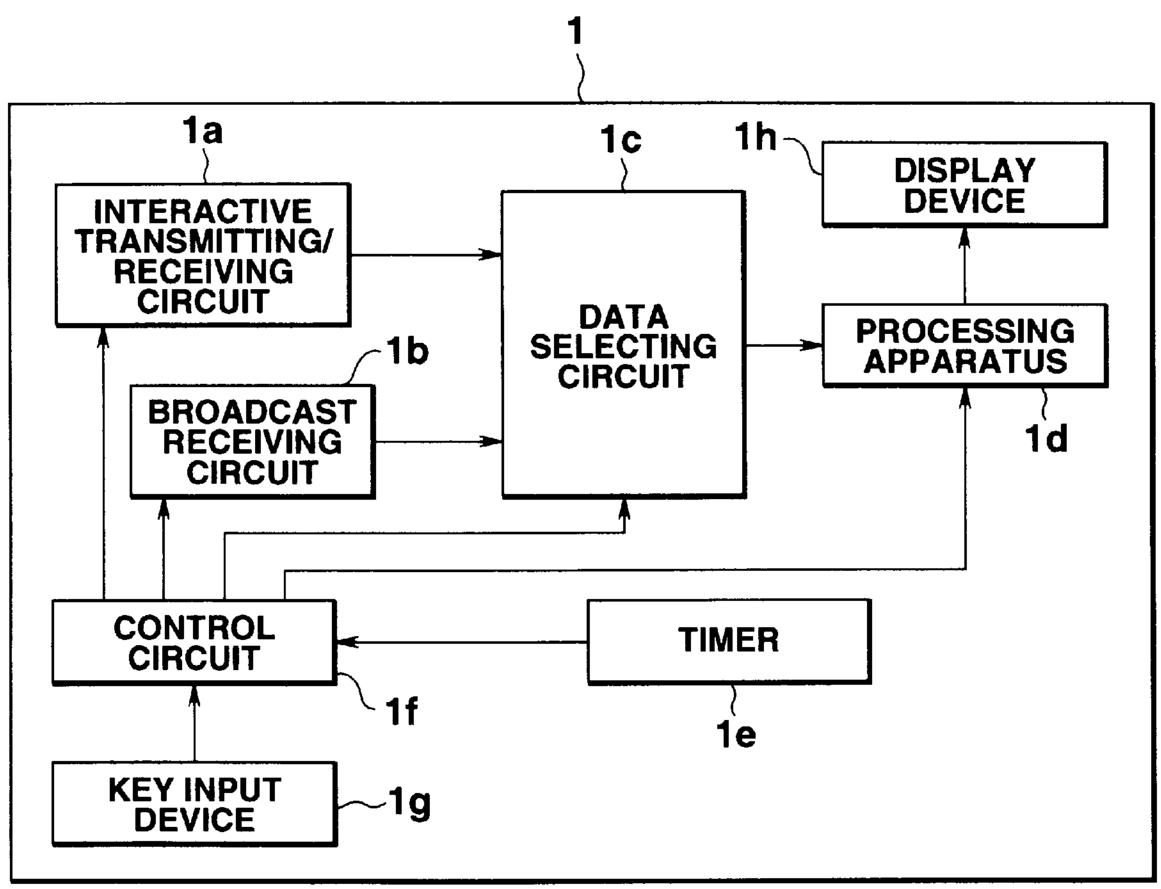
FIG. 3 is a block diagram showing a general constitution of an information terminal.

FIG. 3 is a block diagram showing a general constitution of the information terminal. The information terminal 1 has an interactive transmitting/receiving circuit **1*a* for transmitting/receiving the data relative to the interactive radio network 2 and a broadcast receiving circuit 1*b* for receiving the television signal from the data superimposing broadcast apparatus 3. According to the scheduled time of broadcasting which is previously transmitted via the interactive radio network 2, the information terminal 1 is operated in such a manner that a reception preparation and a data selection are carried out. The broadcast receiving circuit 1*b* is in a sleep state in order to reduce power consumption at a time zone except for a receiving operation. Based on the time measured by a timer 1*e***, the broadcast receiving circuit 1*b* is started by a control circuit If. The broadcast receiving circuit 1*b* is operated so as to receive the television signal to which the large amount data is superimposed. Furthermore, this starting control may include a function of specifying a reception frequency (channel).

A data selecting circuit 1*c* selects the data received by either the interactive radio network 2 or the data superimposing broadcast apparatus 3 under the control of the control circuit 1*f*, and it transmits the data to a processing apparatus 1*d*. The processing apparatus 1*d* processes the supplied data, and the data is converted to a predetermined display format data, so that the data is displayed in a display device 1*h*.

Based on a system clock (not shown), the timer 1*e* measures a present time, and it transmits data indicating the present time to the control circuit 1*f*. The control circuit 1*f* controls each of the above circuits/devices. Furthermore, the control circuit if compares the present time with the scheduled time of broadcasting which is received via the interactive radio network 2. When the scheduled time of broadcasting comes, the broadcast receiving circuit 1*b* starts operation so that the television signal to which the large amount data transmitted from the data superimposing broadcast apparatus 3 is superimposed is received.

Furthermore, a key input device 1*g* includes a keyboard for accessing internet 5, for accessing the value added network 8 and for giving various instructions to the control circuit 1*f*. Furthermore, the display device 1*h* comprises, for example, a liquid crystal display device. The display device 1*h* displays a home page provided on internet 5 and the information of the value added network 8. As the display device 1*h*, such a display device as a CRT may be externally connected.

(A-4) Layer Structure of the Information Terminal

Figure 4:
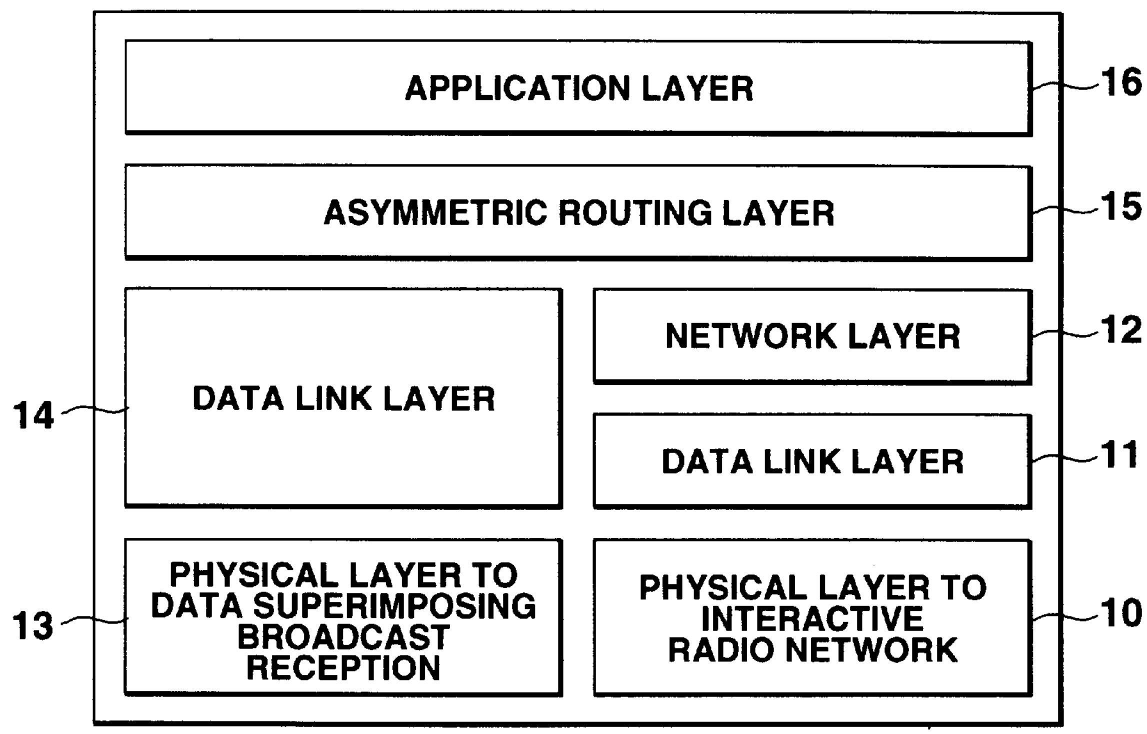
FIG. 4 schematically shows a layer structure of the information terminal.

FIG. 4 is a schematic diagram showing a layer structure of the information terminal 1. The information terminal 1 comprises a physical layer 10 relative to the interactive radio network 2, a data link layer 11, a network layer 12, further, a physical layer 13 relative to the data superimposing broadcast apparatus 3, a data link layer 14. The information terminal 1 further comprises an asymmetric routing layer 15 which is over the network layer 12 and the data link layer 14, and an application layer 16 which is over the asymmetric routing layer 15. The application layer 16 is a Web browser (software), for example, in case of accessing internet 5. Since a routing (switching) between the interactive radio network 2 and the data superimposing broadcast apparatus 3 is carried out by the asymmetric routing layer 15, when a receiver is to be selected, it is not necessary for the application layer 16 to recognize a plurality of receivers.

(B) Operation of the First Embodiment

Figure 5:
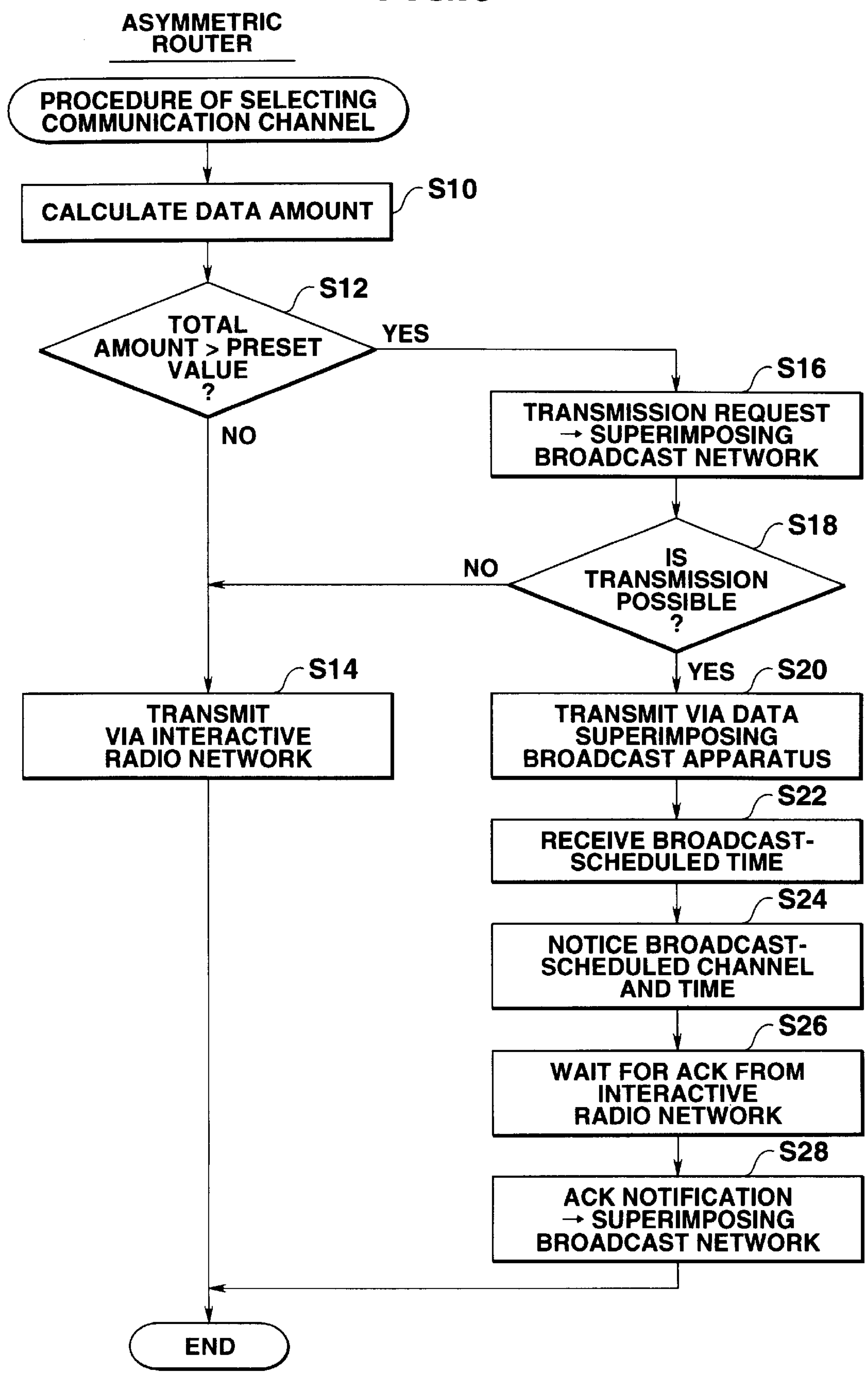
FIG. 5 is a flow chart showing a part of a basic operation of an asymmetric router.
Figure 6:
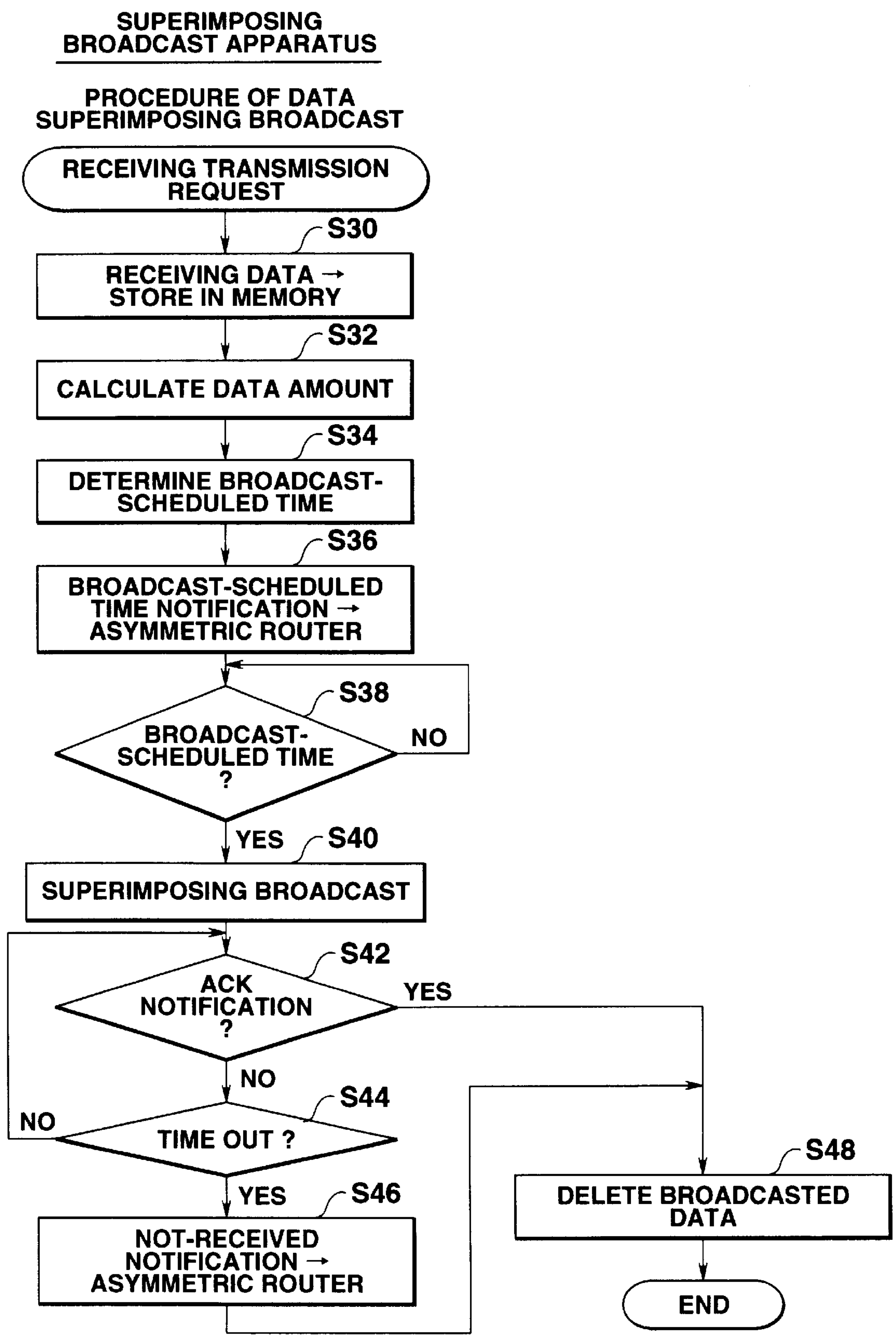
FIG. 6 is a flow chart showing a part of a basic operation of the data superimposing broadcast apparatus.
Figure 7:
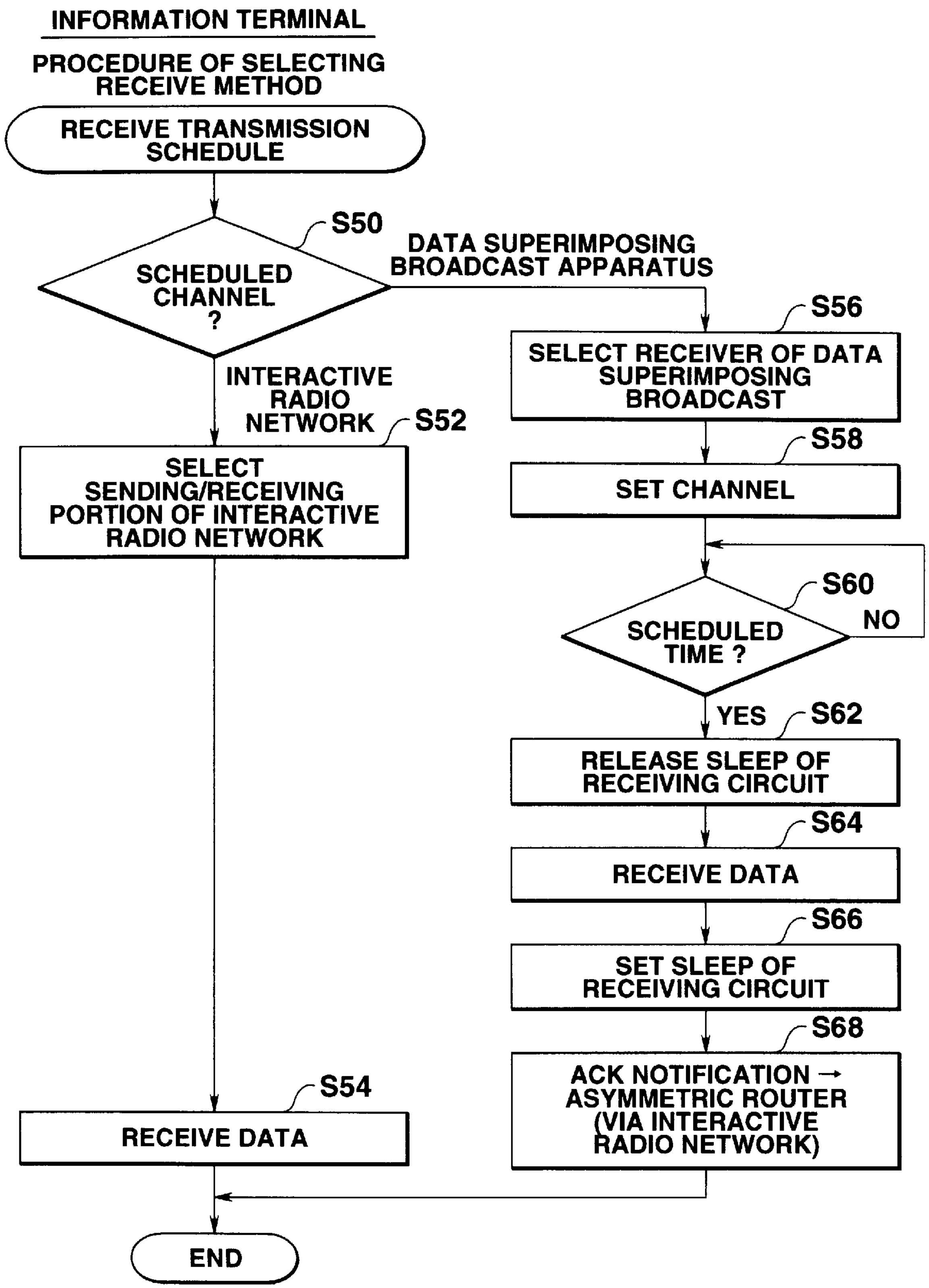
FIG. 7 is a flow chart showing a part of a basic operation of the information terminal.

A part of a basic operation of the asymmetric router 4, the data superimposing broadcast apparatus 3 and the information terminal 1 will be described. FIGS. 5 to 7 are flow charts showing a part of the basic operation of the asymmetric router, the data superimposing broadcast apparatus 3 and the information terminal 1, respectively.

(B-1) Asymmetric Router

A procedure of selecting a channel of a downlink in the asymmetric router 4 will be described with reference to FIG. 5. When the asymmetric router 4 receives the data (large amount or small amount), at step S10, the amount of the received data is calculated. It is determined, a step S12, whether or not the total amount of the data is larger than a preset value. The preset value is a threshold value for determining whether the data to be transmitted to the information terminal 1 should be transmitted by the data superimposing broadcast apparatus 3 or by the interactive radio network 2. When the data has the large amount, it is more effective to transmitted via the data superimposing broadcast apparatus 3 having a relatively high-speed data transfer rate. When the data has the small amount, it is more effective to transmitted via the interactive radio network 2 having a relatively low-speed data transfer rate. Therefore, when the total amount of the data is the preset value or less, the process proceeds to step S14. At step S14, the data is transmitted to the information terminal 1 via the interactive radio network 2.

When the total amount of the data is larger than the preset value, the process proceeds to step S16. At step S16, the transmission request is transmitted to the data superimposing broadcast apparatus 3. At step S18, it is determined whether or not the transmission is possible based on a response from the data superimposing broadcast apparatus 3. For example, the transmission request specifies the channel by which the data should be transmitted. When the transmission is possible, data indicating the channel by which the data should be transmitted is returned. When the transmission is impossible, the process proceeds to step S14. The data is transmitted to the information terminal 1 via the interactive radio network 2.

When the transmission is possible, the process proceeds to step S20. At step S20, the data is transmitted via the data superimposing broadcast apparatus 3. When the data superimposing broadcast apparatus 3 receives the data, the scheduled time of broadcasting is determined based on a data amount, and the data is returned to the asymmetric router 4. At step S22, the asymmetric router 4 receives the scheduled time of broadcasting. At step S24, data transmission channel and the scheduled time of broadcasting are supplied to the information terminal 1 via the interactive radio network 2.

At step S26, it is waited that the ACK signal indicative of a completion of a data reception is supplied from the information terminal 1 via the interactive radio network 2. When the ACK signal is received, the received ACK signal is transmitted to the data superimposing broadcast apparatus 3 at step S28 and then the process is completed.

(B-2) Data Superimposing Broadcast Apparatus

A broadcasting procedure of the downlink in the data superimposing broadcast apparatus will be described with reference to FIG. 6. When the data superimposing broadcast apparatus 3 receives the data from the asymmetric router 4, the data is temporally stored in the memory 3*a* at step S30. At step S32, the received data amount is calculated. At step S34, the scheduled time of broadcasting is determined based on the obtained data amount. The scheduled time of broadcasting is transmitted to the asymmetric router 4.

At step S38, it is determined whether or not the scheduled time of broadcasting comes. If the scheduled time of broadcasting is not reached, step S38 is repeated, and it is in a waiting mode. When it is the scheduled time of broadcasting, the process proceeds to step S40. At step S40, the data stored in the memory 3*a* at step S30 is superimposed on an empty portion of the usual television signal and it is broadcasted. At step S42, it is determined whether or not the ACK signal from the asymmetric router 4 is received. The ACK signal is a confirmation signal indicative of receiving the whole data transmitted to the asymmetric router 4 by the information terminal 1 receiving the television signal to which the data is superimposed. The ACK signal is transmitted to the data superimposing broadcast apparatus 3 via the asymmetric router 4.

If the ACK signal from the asymmetric router 4 is not received, the process proceeds to step S44 in which it is determined whether or not it is time out. If not, the process is returned to step S42 in order to wait until the ACK signal is received. When the ACK signal cannot be received after a superimposing broadcast of the data, it is time out. In this case, the process proceeds to step S46, and a not-received notification is transmitted to the asymmetric router 4 in order to notify that the information terminal 1 cannot receive the data.

After the superimposing broadcast of the data, when the ACK signal is received from the information terminal 1 via the asymmetric router 4 at step S42, it can be determined that the data is received by the information terminal 1. The process proceeds to step S48 in which the broadcasted data is erased from the memory 3*a*. Then, the process is completed.

(B-3) Information Terminal

The procedure of selecting a reception path in the information terminal will be described with reference to FIG. 7. At step S50, the information terminal 1 determines whether a scheduled channel is the interactive radio network 2 or the data superimposing broadcast apparatus 3. When the scheduled channel is the interactive radio network 2, the process proceeds to step S52. The interactive transmitting/receiving circuit (receiving circuit) 1*a* being a receiving function of the interactive radio network 2 is selected and it is started. At step S54, the small amount data is received from the interactive radio network 2.

When the scheduled channel is the data superimposing broadcast apparatus 3, the process proceeds to step S56. The broadcast receiving circuit 1*b* being the receiving function of the data superimposing broadcast apparatus 3 is selected. At step S58, the channel to be broadcasted notified from the asymmetric router 4 is set. At step S60, with reference to the present time of the timer 1*e*, it is determined whether or not the scheduled time of broadcasting notified from the asymmetric router 4 comes. If the scheduled time of broadcasting is not reached, step S60 is repeated, and it is in the waiting mode. When the scheduled time of broadcasting comes, the process proceeds to step S62. The sleep of the broadcast receiving circuit 1*b* is released. At step S64, the television signal from the data superimposing broadcast apparatus 3 to which the data is superimposed is received.

When the reception of the data superimposed to the television signal is completed, the broadcast receiving circuit 1*b* is returned to the sleep state at step S66. At step S68, after the ACK signal indicative of the completion of the data reception is transmitted to the asymmetric router 4 via the interactive radio network 2, the process is completed.

(B-4) Whole Operation

Figure 8:
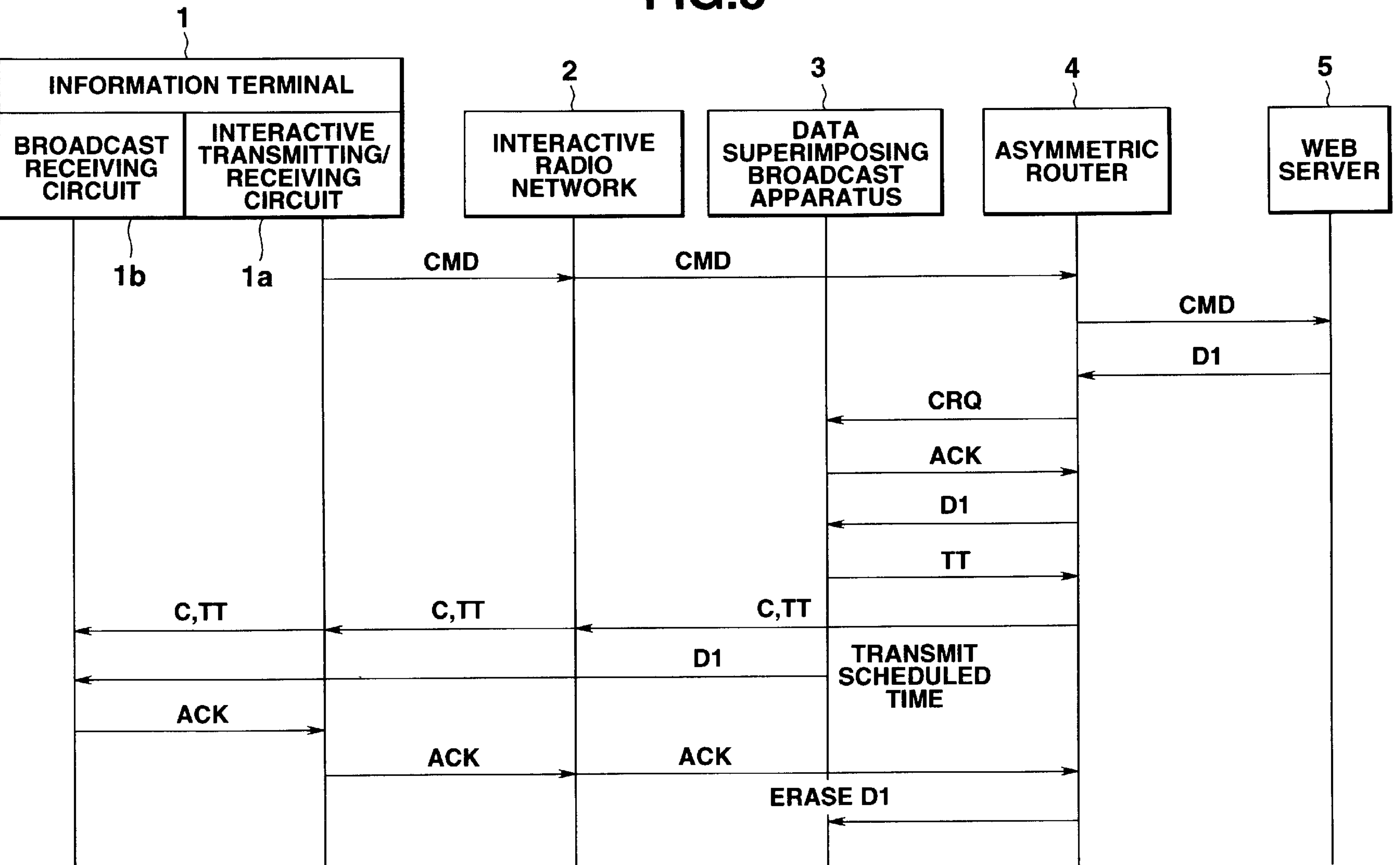
FIG. 8 is a flow chart showing the operation of the interactive communication system according to the first embodiment.

A whole operation of the first embodiment will be described. FIG. 8 is a sequence for explaining the operation of the interactive communication system according to the first embodiment. When the transmission request is transmitted from the Web browser to the Web server 6 on internet 5, the information terminal 1 transmits a command CMD to the asymmetric router 4 via the interactive radio network 2. The asymmetric router 4 transmits the command CMD to the Web server 6 via internet 5. According to the received command CMD, the Web server 6 transmits, for example, a browser data (an HTML formatted file) D1 to the asymmetric router 4 via internet 5.

When a data amount of the browser data D1 transmitted from the Web server 6 exceeds a predetermined amount, the asymmetric router 4 transmits a channel requirement CRQ to which the browser data D1 should be transmitted to the data superimposing broadcast apparatus 3. The data superimposing broadcast apparatus 3 returns data indicating the idle channel and the ACK signal to the asymmetric router 4. When the asymmetric router 4 receives the ACK signal, the browser data D1 is transmitted to the data superimposing broadcast apparatus 3. When the data superimposing broadcast apparatus 3 receives the browser data D1, the scheduled time of broadcasting is determined in accordance with the data amount. The scheduled time of broadcasting is transmitted to the asymmetric router 4 as a time tag TT.

When the asymmetric router 4 receives the time tag TT, data indicating a previously received transmitting channel C and the time tag TT are transmitted to the information terminal 1 via the interactive radio network 2. The information terminal 1 receives the data indicating data transmission channel C and the time tag TT by the interactive transmitting/receiving circuit 1*a*. According to the time tag TT, the information terminal 1 waits until the television signal to which the browser data D1 is superimposed is transmitted.

When the scheduled time of broadcasting comes, the data superimposing broadcast apparatus 3 superimposes the browser data D1 to the television signal of the preset transmitting channel C by using the superimposing apparatus 3*b*, so that the television signal is transmitted. Similarly, when the scheduled time of broadcasting comes, the information terminal 1 starts the broadcast receiving circuit 1*b*. The television signal to which the browser data D1 is superimposed is received by the started broadcast receiving circuit 1*b*. The browser data D1 is extracted from the television signal. A predetermined formatted display data is generated. The data is displayed in the display device 1*h*. Furthermore, the information terminal 1 transmits the ACK signal indicative of the reception completion of the browser data D1 to the interactive transmitting/receiving circuit 1*a*. The ACK signal is transmitted to the asymmetric router 4 via the interactive radio network 2 by the interactive transmitting/receiving circuit 1*a*. When the asymmetric router 4 receives the ACK signal, the ACK signal is transmitted to the data superimposing broadcast apparatus 3. The data superimposing broadcast apparatus 3 erases the browser data D1 stored in the memory 3*a*.

In such a manner, according to the first embodiment, a data stream (the small amount data such as the command) in an upstream direction relative to the information terminal 1 is transmitted via the interactive radio network 2 whose data transfer rate is relatively low. On the other hand, a data stream (the large amount data such as the browser data) in a downstream direction relative to the information terminal 1 is transmitted by the data superimposing broadcast apparatus 3 whose data transfer rate is relatively high. Therefore, a load of the relatively low-speed interactive radio network 2 is reduced, and further the data can be transmitted at a high speed.

(C) Second Embodiment

A second embodiment of the present invention will be described. According to the second embodiment, among a plurality of data superimposing broadcast apparatuses, the data superimposing broadcast apparatus in which a present position of the information terminal 1 is defined as a service area (radio wave arriving area) is selected. The television signal to which the large amount data is superimposed is transmitted from the selected data superimposing broadcast apparatus. Furthermore, when the data amount to be transmitted exceeds the amount which the data superimposing broadcast apparatus 3 can broadcast, the large amount data is transmitted via the interactive radio network 2. The constitution and the operation of the second embodiment will be described below.

Figure 9:
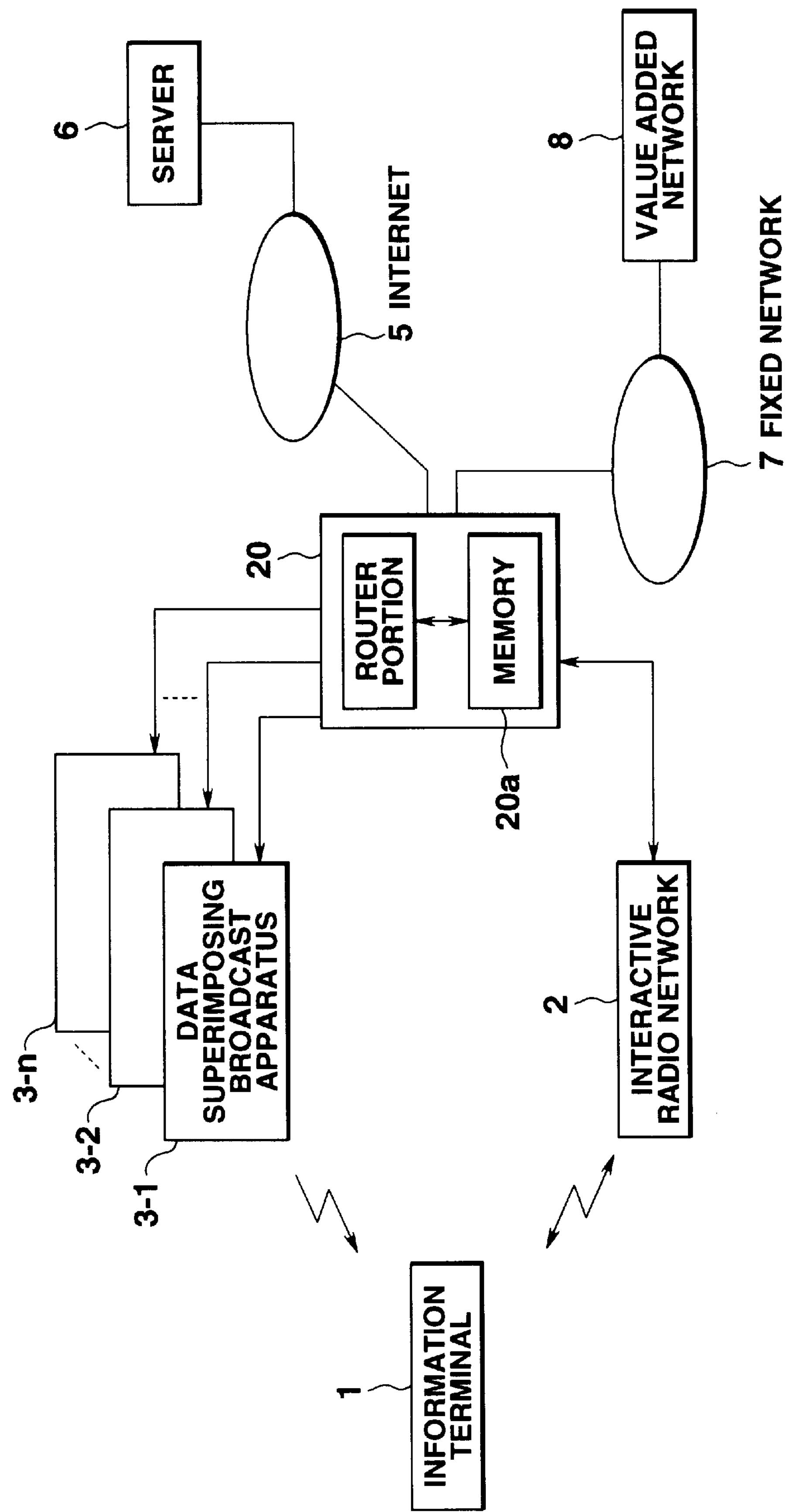
FIG. 9 is a block diagram showing a constitution of an interactive communication system according to a second embodiment of the present invention.

FIG. 9 is a block diagram showing the constitution of the interactive communication system according to the second embodiment of the present invention. The same portions as those of the first embodiment will be indicated in the same reference numerals and their detailed description will be omitted. An asymmetric router 20 comprises a memory 20*a* for temporally storing the large amount data received via internet 5 or the fixed network 7. The large amount data is usually provided for any one of data superimposing broadcast apparatuses 3-1, 3-2, . . . , 3-n. The data is transmitted to the information terminal 1 by the data superimposing broadcast apparatus 3-i (i=1 to n). However, when the data amount to be transmitted exceeds the amount which the data superimposing broadcast apparatus 3-i can broadcast, the large amount data must be transmitted via the interactive radio network 2. In this case, since the interactive radio network 2 has a relatively low data transfer rate, the large amount data is needed to be temporally stored. As described above, when the data amount cannot be transmitted by the data superimposing broadcast apparatus 3-i, the memory 20*a* of the asymmetric router 20 is used for transmitting via the interactive radio network 2.

Furthermore, each of the data superimposing broadcast apparatuses 3-1 to 3-n is provided in each region to which a predetermined outputted broadcast wave can arrive. The large amount data is superimposed to the television signal and broadcasted by the apparatus in which the present position of the information terminal 1 is defined as the service area. The asymmetric router 20 obtains the present position of the information terminal 1 via the base stations provided in each predetermined area in the interactive radio network 2. The asymmetric router 20 selects based on the obtained present position of the information terminal 1 to which the data superimposing broadcast apparatuses 3-1 to 3-n the large amount data is supplied. The asymmetric router 20 is previously provided with a correspondence as a table between the present position of the information terminal 1, that is, the area where the information terminal 1 exists which is obtained via the base station and the data superimposing broadcast apparatus 3 in which the area is defined as the service area.

(D) Operation of the Second Embodiment

When the asymmetric router 20 receives the command for a connection requirement to the Web server 6 on internet 5 from the information terminal 1 via the interactive radio network 2, the command is transmitted to the Web server 6 via internet 5. When the command is received, a position information indicative of the present position of the information terminal 1 is obtained. When the data (browser data) of large amount transmitted from the Web server 6 on internet 5 is received, the asymmetric router 20 temporarily stores the received browser data in the memory 20*a*.

Based on the position information of the information terminal 1, the asymmetric router 20 requires for the channel by which the browser data is transmitted to the corresponding data superimposing broadcast apparatus 3-i among the data superimposing broadcast apparatuses 3-i to 3-n. When data transmission to the corresponding data superimposing broadcast apparatus 3-i is possible, the browser data which is temporarily stored in the memory 20*a* is transmitted to the corresponding data superimposing broadcast apparatus 3-i in the same way as the first embodiment. Thereafter, similarly to the first embodiment, the data superimposing broadcast apparatus 3-i superimposes the browser data to the television signal and it broadcasts the signal at a predetermined scheduled time of broadcasting.

When data transmission to the corresponding data superimposing broadcast apparatus 3-i is impossible, the asymmetric router 20 notifies the information terminal 1 that the interactive radio network 2 should be used to transmit the browser data. Thereafter, the browser data which is temporarily stored in the memory 20*a* is transmitted to the information terminal 1 via the interactive radio network 2. According to the notification from the asymmetric router 20, as shown in the flow charts of FIGS. 5–7, the information terminal 1 sets the reception path in the interactive radio network 2. The interactive transmitting/receiving circuit 1*a* receives the browser data. A display data is generated from the browser data. The display data is displayed in the display device 1*h*. When the asymmetric router 20 receives the ACK signal indicative of the reception completion of the browser data from the information terminal 1, the browser data in the memory 20*a* is erased.

As described above, according to the second embodiment, the large amount data is superimposed to the television signal and broadcasted (transmitted) by the data superimposing broadcast apparatus 3-i alone in which the present position of the information terminal 1 is defined as the service area among the plural data superimposing broadcast apparatuses 3-i to 3-n. Therefore, a resource of the radio wave can be effectively used. Furthermore, if there is no data superimposing broadcast apparatus which can transmit the data, the large amount data is temporarily stored in the memory 20*a* provided in the asymmetric router 20. The data stored in the memory 20*a* is transmitted to the information terminal 1 via the interactive radio network 2. Therefore, even if the data superimposing broadcast apparatus is occupied, it is not necessary to wait for a long time, and the large amount data can be received.

(E) Third Embodiment

A third embodiment of the present invention will be described. According to the third embodiment, in order that the data (the small amount and the large amount) may be transmitted/received between specific information terminals alone, the data is encrypted so as to be transmitted/received.

Figure 10:
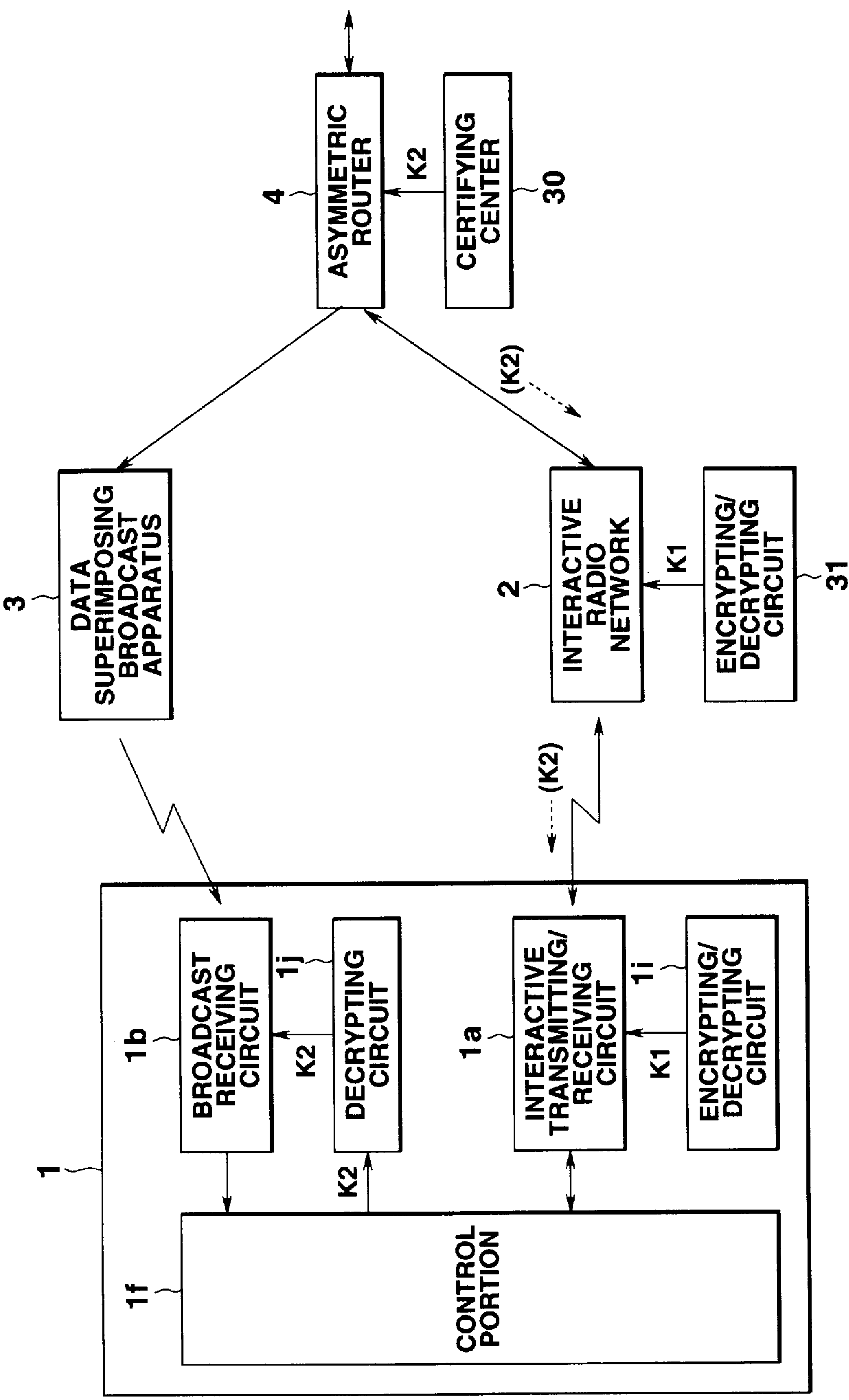
FIG. 10 is a block diagram showing a constitution for realizing an encryption processing so as to transmit the data to a specific information terminal alone.

FIG. 10 is a block diagram showing a constitution for realizing an encryption processing so as to transmit the data to the specific information terminal alone. The same portions as those of the first embodiment will be indicated in the same reference numerals and their detailed description will be omitted. A certifying center 30 has an inherent encrypting key K for the asymmetric router 4, and the encrypting key K is supplied to the asymmetric router 4. The asymmetric router 4 encrypts the large amount data to the data superimposing broadcast apparatus 3 by using the encrypting key K. Based on the request from the information terminal 1, the asymmetric router 4 transmits the encrypting key K to the information terminal 1 via the interactive radio network 2.

An encrypting/decrypting portion 31 includes an inherent encrypting key K1 for the interactive radio network 2. The encrypting key K1 is supplied to the interactive radio network 2. The interactive radio network 2 uses the encrypting key K1, so that the small amount data between the information terminals is encrypted and decrypted.

The information terminal 1 comprises an encrypting/decrypting portion 1*i* for encrypting/decrypting the small amount data to be transmitted/received between the information terminal 1 and the interactive radio network 2 by using the encrypting key K1. Furthermore, the information terminal 1 comprises a decrypting portion 1*j* for decrypting the large amount data from the data superimposing broadcast apparatus 3 by using an encrypting key K2 obtained from the asymmetric router 4 via the interactive radio network 2.

It is assumed that the interactive radio network 2 encrypted by the encrypting key K1 being a safe path can be used. The certifying center 30, preferably, uses "One Time Pad encryption system" using the time tag and the like, as the encryption system. The "One Time Pad encryption system" always generates the encrypting key for encrypting/decrypting. Furthermore, the encrypting key is used only once, and the same encrypting key is not used repeatedly. That is, whenever the data necessary for the encryption is generated, the encrypting key K2 is generated. The encrypting key K2 is used so that the data superimposing broadcast is encrypted. Thereafter, the encrypting key K2 is transmitted to the information terminal 1 via the interactive radio network 2, and the same-valued encrypting key K2 is never used.

According to the third embodiment, the data to be transmitted/received is encrypted between the asymmetric router 4 and the data superimposing broadcast apparatus 3, between the interactive radio network 2 and the information terminal 1 and between the data superimposing broadcast apparatus 3 and the information terminal 1, whereby the data can be safely transmitted. Furthermore, since the data can be received by the information terminal 1 which is previously authorized by the certifying center 30, for example, a charge management for each information terminal can be realized, which is very effective for providing a service.

(F) Fourth Embodiment

A fourth embodiment of the present invention will be described. According to the fourth embodiment, the constitution for reducing the load of the information terminal is provided. In general, for example, in case of accessing the Web server 6 on internet 5, in a general personal computer (or the terminal for accessing internet), for example, the Web browser is implemented on an OS environment such as Windows (trademark), whereby the access can be realized. However, in this case, since a sufficient memory amount and a high-speed processing are needed, a cost of the terminal is increased. Furthermore, a circuit constitution becomes complicated and large-scaled, so that portability is lost.

Figure 11:
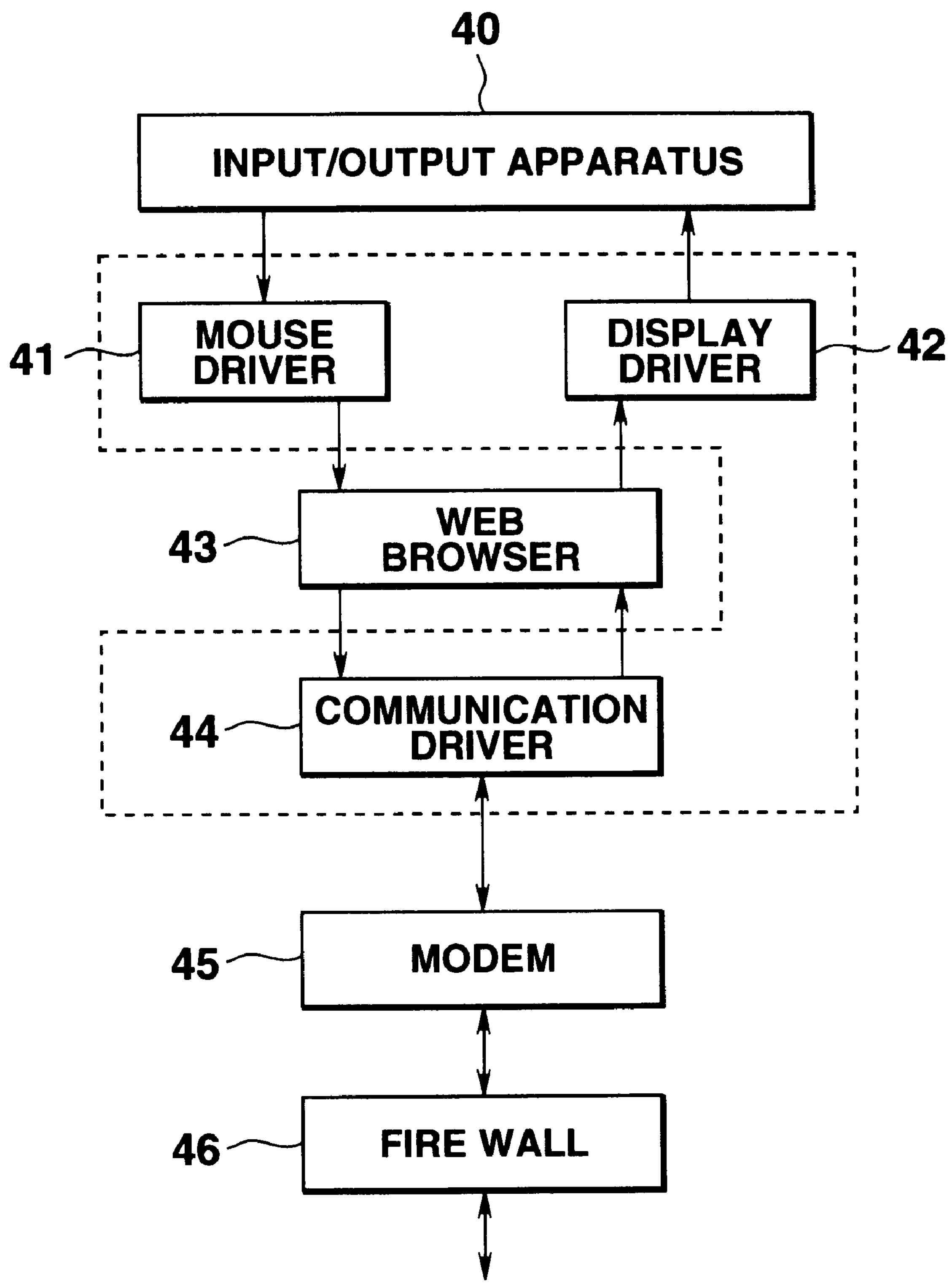

FIG. 11 is a block diagram showing the constitution using the terminal such as a conventional personal computer. An input/output apparatus 40 is a display (a liquid crystal display and the like) and a mouse/keyboard (which may be a cursor key and a track ball provided in a housing). A mouse driver 41 and a display driver 42 on the OS control the input/output apparatus 40. A Web browser 43 is application software operated under the OS. The Web browser 43 generates the predetermined format display data from the browser data. The Web browser 43 displays the data in the display device by using the display driver 42. The Web browser 43 receives the input signal from the mouse/keyboard operated by the user.

Furthermore, at the access to internet 5, the Web browser 43 transmits a specification (command) of a browsing page, the instruction (command) to download a program assigned to the page and the like to a communication driver 44. The communication driver 44 is software on the OS. The communication driver 44 controls a modem 45 (or an Ethernet card and the like), and it transmits the command to internet 5. In some cases, the connection to internet 5 is carried out via a fire wall 46 such as a Proxy server. The fire wall 46 is a security software for preventing an external invasion (access) to the information terminal 1. According to the information terminal comprising the conventional constitution, in addition to the OS, the software of large amount such as the Web browser must be started. Therefore, the memory amount and a processing rate are limited, so that it is difficult to realize a comfortable environment.

Figure 12:
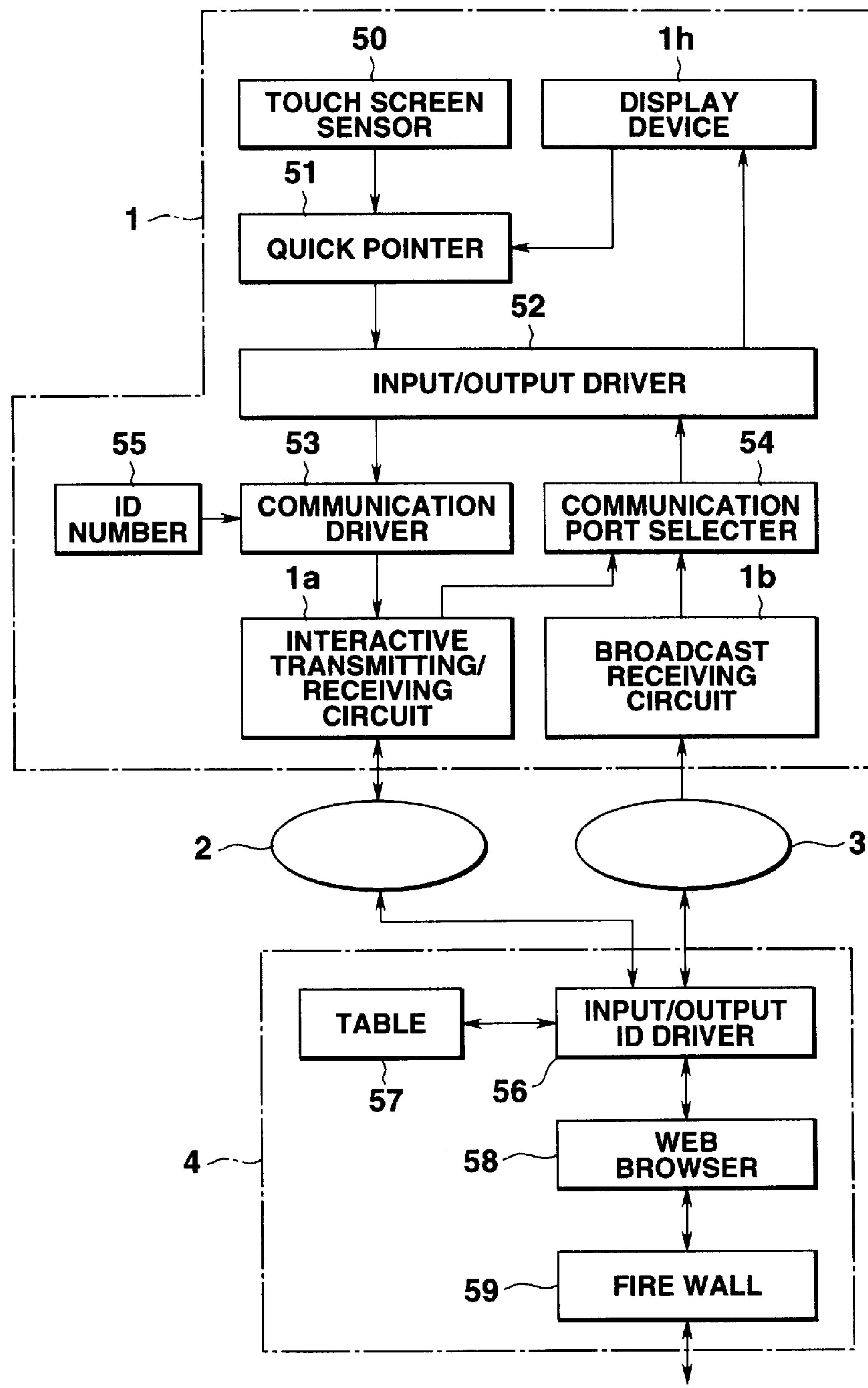
FIG. 12 is a block diagram showing a general constitution of the information terminal and the asymmetric router according to a fourth embodiment.

According to the fourth embodiment, the asymmetric router 4 carries out the processing of the Web browser, and the information terminal 1 carries out only an input/output processing. The fourth embodiment will be described in detail below. FIG. 12 is a block diagram showing a general constitution of the information terminal and the asymmetric router according to the fourth embodiment. The same portions as those of the first embodiment (FIG. 3) will be indicated in the same reference numerals and their detailed description will be omitted.

The display device 1*h* is the display device comprising the liquid crystal display device and the like, as described above. The predetermined format display data (the large amount data: the browser data, the small amount data: the command) supplied via an input/output driver 52 is displayed. A touch screen sensor 50 is a sensor for sensing a touch on a screen of the display device 1*h* by the user. A touched position is supplied to a quick pointer 51. According to the touched position from the touch screen sensor 50 and a display screen information of the display device 1*h*, the quick pointer 51 obtains which position is touched on the display screen (position information). The position information is supplied to a communication driver 53 via the input/output driver 52.

The communication driver 53 supplies the position information as the command to the interactive transmitting/receiving circuit 1*a*. On demand, the communication driver 53 may supply an ID number 55 for identifying the information terminal 1 to the interactive transmitting/receiving circuit 1*a*. A communication port selector 54 selectively switches the small amount data supplied from the interactive radio network 2 via the interactive transmitting/receiving circuit 1*a* or the large amount data (browser data) from the data superimposing broadcast apparatus 3 received by the broadcast receiving circuit 1*b*. The data is supplied to the display device 1*h* via the input/output driver 52.

In the asymmetric router 4, an input/output ID driver 56 shown in FIG. 12 receives the data and the ID number transmitted from the information terminal 1 via the interactive radio network 2. Referring to a correspondence table 57 which stores a correspondence between the ID number and an address of internet, the data is transmitted to a Web browser 58. Furthermore, the large amount data (such as the browser data) received by the Web browser 58 is supplied to the data superimposing broadcast apparatus 3. As described above, the Web browser 58 is the software for accessing internet 5. According to the data from the input/output ID driver 56, the Web browser 58 accesses a predetermined server 6 on internet 5. Furthermore, the connection to internet 5 may be carried out via a fire wall 59 such as the Proxy server as usual.

According to the fourth embodiment, the asymmetric router 4 comprises the software for accessing internet 5. The information terminal 1 comprises the software alone for the input/output processing. Therefore, the load of the memory amount and the processing rate in the information terminal 1 can be reduced, so that the apparatus can be used in the comfortable environment. Thus, the user can access the server 6 on internet 5 by the inexpensive and light weight information terminal 1. Furthermore, by the information terminal which does not have the address of internet 5, the user can access the server 6 on internet 5.

(G) Fifth Embodiment

A fifth embodiment of the present invention will be described. According to the fifth embodiment, as the interactive radio network 2, a plurality of interactive radio networks such as the PHS which can provide the service in a predetermined area and a cellular telephone (portable telephone) which can provide the service almost all over the area can be used. Based on the present position of the mobile information terminal 1, the available interactive radio network can be selected.

The fifth embodiment comprises the same as the second embodiment. A radio network identification data indicative of the available interactive radio network in the corresponding area is superimposed to each television signal transmitted from a plurality of data superimposing broadcast apparatuses provided in each area. When the information terminal 1 is moved to another area, it is confirmed the radio network identification data superimposed to the television signal received at a place to which the information terminal 1 is moved. Therefore, the available interactive radio network can be selected in the present area.

Furthermore, when the information terminal 1 is moved, a fact that the television signal can be received at the place to which the information terminal 1 is moved may be notified to the asymmetric router 4 via the interactive radio network 2. Therefore, the asymmetric router 4 can interactively transmit/receive the data relative to the information terminal 1 via the notified interactive radio network 2.

Furthermore, the above two systems may be combined to each other. The radio network identification data indicative of the available interactive radio network 2 in the corresponding area is superimposed to each television signal transmitted from a plurality of data superimposing broadcast apparatuses. A fact that the moved information terminal 1 can receive the television signal may be notified to the asymmetric router 4 via the interactive radio network 2 indicated by radio network identification data which is superimposed to the television signal and is broadcasted.

According to the fifth embodiment, even if the information terminal 1 is moved and it is moved to the service area for the different interactive radio network 2 and data superimposing broadcast apparatus 3, the appropriate interactive radio network 2 can be selected based on the present position of the information terminal 1. Therefore, it is possible for the information terminal 1 to move over a wide range.

(H) Sixth Embodiment

Figure 13:
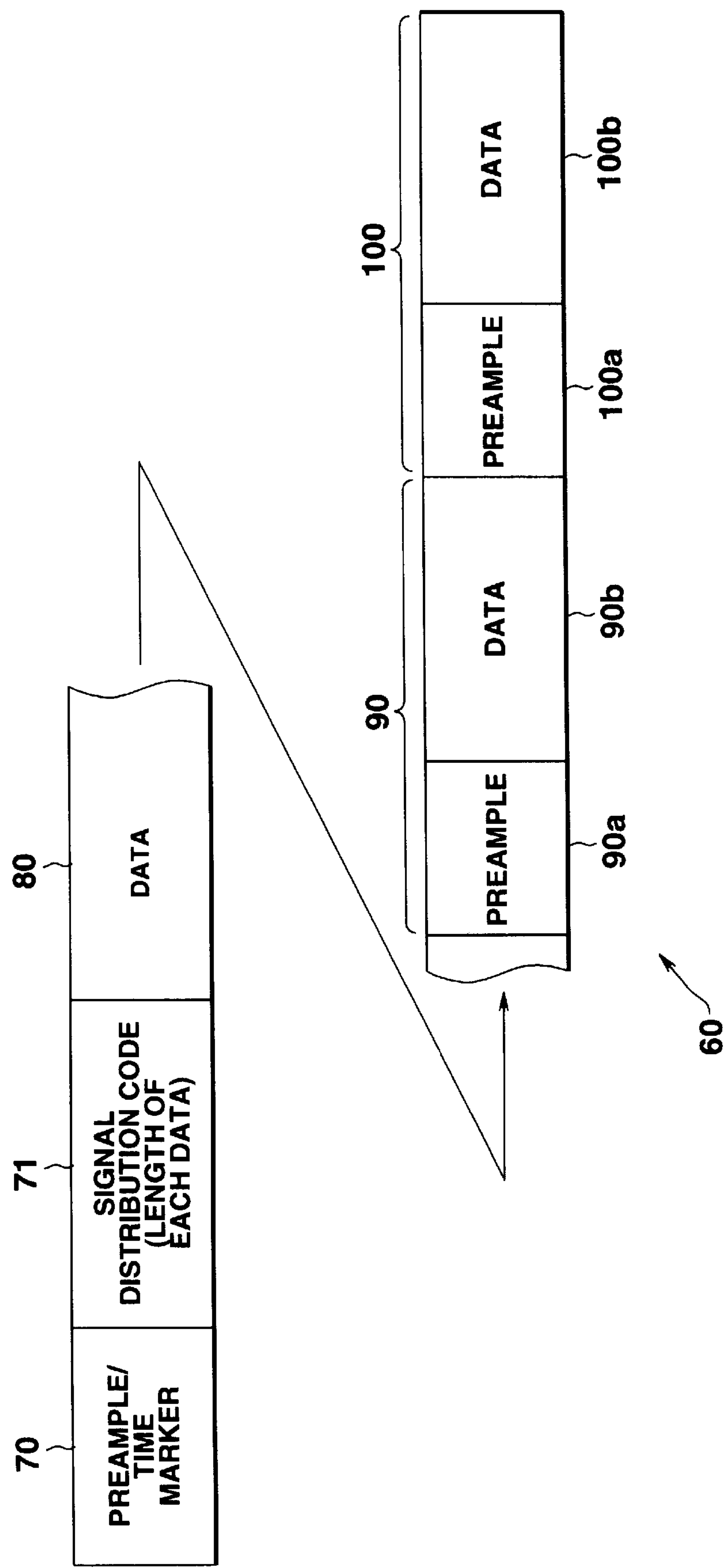
FIG. 13 schematically shows a data format broadcasted by the data superimposing broadcast apparatus according to a sixth embodiment of the present invention.

A sixth embodiment of the present invention will be described. According to the sixth embodiment, the data format broadcasted by the data superimposing broadcast apparatus 3 comprises the constitution shown in FIG. 13, so that a finer service is provided. In FIG. 13, a frame 60 comprises a preamble/time marker 70, a signal distribution code (length of each data) 71, a data 80 related to an individual user, a data 90 related to a group user and a public data 100.

The length of one frame 60 is variable so that the length of each data can be flexibly set. In order to reduce the power consumption, the frame 60 comprises a periodical time marker. According to the time marker, a flexible frame constitution is realized. The signal distribution code 71 specifies a distribution of each length of the data 80 related to the individual user, the data 90 related to the group user and the public data 100. The signal distribution code 71 is encoded.

The data 80 related to the individual user is encrypted so that a specific individual can decrypt the encrypted data by the key which is specified by an individual ID of the individual. A detail of the encryption is described in the third embodiment. The data 90 related to the group user is encrypted so that a common group can decrypt the encrypted data by the key specified by a group ID of the group. The data 90 related to the group user comprises a preamble 90*a* at the head thereof. The public data 100 is not encrypted so that many and unspecified receivers (information terminals) can freely receive the data. Similarly to the data 90 related to the group user, the public data 100 comprises a preamble 100*a* at the head thereof.

The individual ID may be different from the group ID. The group ID may be embedded into a predetermined position of the individual ID. In an embedding form, for example, the ID form is defined as "AAAABB", the former "AAAA" is used for the individual ID for identifying the individual, and the latter "BB" is used for the group ID for identifying the group.

According to the sixth embodiment, the data which is superimposed to the television signal and transmitted from the data superimposing broadcast apparatus 3 is formed by the data 80 related to the individual user, the data 90 related to the group user and the public data 100, whereby the broadcast-authorized user can be flexibly set. The data 80 related to the individual user and the data 90 related to the group user are encrypted so that the broadcast-authorized user alone can decrypt the data, whereby a leakage of the information can be prevented. Furthermore, the time marker 70 is added, so that the information terminal 1 starts the reception by matching to a reception timing. Therefore, at the time except for the reception timing, the information terminal 1 is in the sleep state, whereby the power consumption can be reduced.

(I) Seventh Embodiment

A seventh embodiment of the present invention will be described. According to the seventh embodiment, in the data superimposing broadcast apparatus 3, a plurality of directional antennas directed in different directions are used, whereby radio waves of a common frequency can be used for each antennas, so that the data related to respective users are simultaneously transmitted to a plurality of users. As described in the sixth embodiment, in data transmission of the data related to the individual user, in order to communicate with the specific individual user via the interactive radio network 2, the service area corresponding to the base station number is known, so that the position of the individual user can be specified.

When the large amount data is simultaneously transmitted to a plurality of individual users, a plurality of directional antennas directed in different directions are used for the data superimposing broadcast apparatus 3. Therefore, if a plurality of individual users are sufficiently separated from one another in a direction which can sufficiently ensure a CIR (Carrier-to-Interference Ratio) by a directivity of the antenna, the different data can be simultaneously transmitted to the corresponding user by the common frequency.

Figure 14:
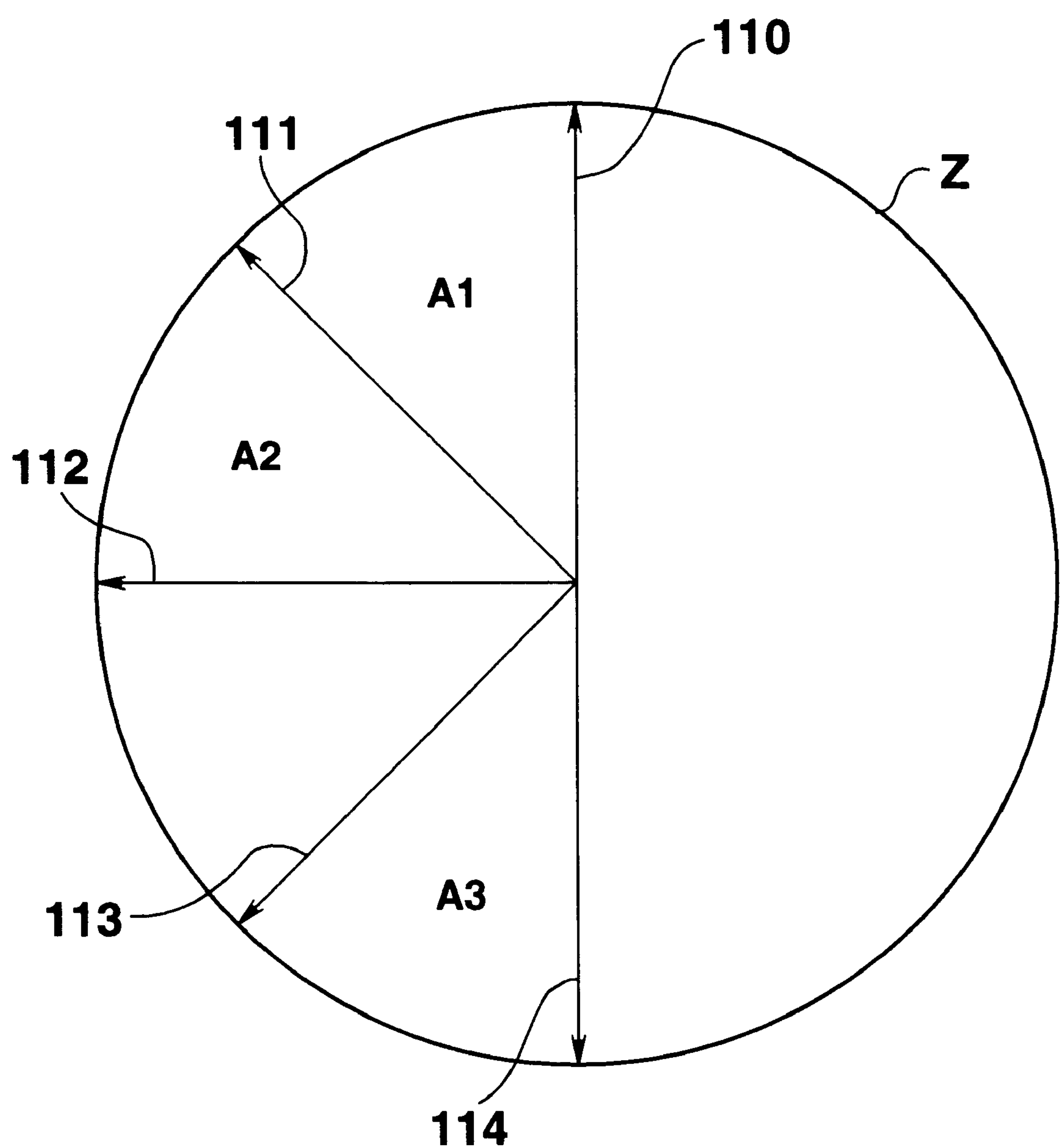
FIG. 14 schematically shows the operation in case of using a directional antenna according to a seventh embodiment of the present invention.

FIG. 14 schematically shows the operation in case of using the directional antenna according to the seventh embodiment. In FIG. 14, a reference symbol Z denotes the service area of the broadcast by the data superimposing broadcast apparatus 3. Reference symbols A1, A2, A3 are the service areas of the broadcast by respective base stations of the interactive radio network 2. That is, a plurality of base stations exist in the service area Z of the broadcast by one data superimposing broadcast apparatus 3. The interactive radio network 2 is formed of a plurality of base stations. A plurality of base stations of the interactive radio network 2 may be overlapped on the service area by the different data superimposing broadcast apparatus 3. Furthermore, reference numbers 110, 111, 112, 113, 114 denote boundaries of the directivity of each directional antenna of the data superimposing broadcast apparatus 3, respectively.

The directivity of the individual user accessing the Web server 6 on internet 5 in the service area A1 may be overlapped on that of the individual user accessing in the service area A2. Therefore, although it is difficult to ensure a sufficient CIR, there is a possibility that the directivity of the user in the service area A1 may be separated from that of the user in the service area A3 by a sufficient directivity. In this case, the corresponding different data can be transmitted from the antennas corresponding to each service area to the individual user in the service area A1 and the individual user in the service area A3, respectively, with the same frequency at the same time. The individual user in the service area A1 and the individual user in the service area A3 can simultaneously receive the corresponding data.

When the data is transmitted to the individual user in the service area A1 alone, the directional antenna limited by the directional boundaries 110 and 111 is used, whereby it is not necessary to transmit the radio wave in any other unnecessary directions, so that a radio wave resource can be effectively used. Furthermore, since an unnecessary radio wave is not outputted, interference between the radio waves can be reduced.

According to the above embodiments, although only the browser data of internet 5 is described above, the present invention is not limited to this. The value-added network 8 is the same as above. For example, the present invention can be applied to a television learning system, news (selection of detailed items), advertisement (requirement of contents explanation), a quiz/game (answer), a questionnaire and the like. Furthermore, if the encryption technique and the individual ID are used, an education system, a home shopping and the like to the specific individual are possible.

As described above, according to the present invention, the following effects can be obtained.

(1) The information terminal can perform the interactive communication. When respective information amounts to be transmitted in up link and down link are asymmetric to each other, i.e., they are different from each other, more specifically, when the down link information amount is larger than the up link information amount, the large amount data is transmitted from means for transmitting the large amount data which can transmit the large amount data. Therefore, data transmission can be so effectively carried out as to make the most of a high speed of the means for transmitting the large amount data, whereby the load applied to the interactive radio network can be reduced.

(2) In the interactive radio network, the base station which interactively transmits/receives the data relative to the information terminal existing in the corresponding service area is located in each predetermined service area. Therefore, as the interactive radio network, for example, existing PHS and cellular telephone (portable telephone) can be used.

(3) Since the large amount data is usually superimposed to the idle area of the television signal to be broadcasted and it is broadcasted, a usual television broadcasting station can be used as the means for transmitting the large amount data.

(4) In the means for transmitting the large amount data, the large amount data to be transmitted is temporarily stored in the memory, whereby the scheduled time of broadcasting can be set according to the data amount of the large amount data. Therefore, a transmitting schedule can be determined. Furthermore, the scheduled time of broadcasting is supplied to the information terminal, whereby the information terminal may operate means for receiving the large amount data during the time zone when the large amount data is transmitted. Therefore, the power consumption can be reduced.

(5) Since appropriate means for transmitting the large amount data can be selected from a plurality of means based on the present position of the information terminal, the radio wave resource can be effectively used.

(6) A predetermined encryption is carried out relative to the data transmitted/received between the information terminal and the interactive radio network and the data transmitted from the mean for transmitting the large amount data to the information terminal. Therefore, the leakage of the information can be prevented. Furthermore, the specific information terminal alone which obtains the encrypting key can receive (decrypt) the data. Therefore, for example, a charged service necessary for the charge management can be provided.

(7) When the server on internet is assumed as information providing means, the asymmetric router comprises browsing means for browsing the information (the large amount data) on the server. The information terminal carried out only such processes as to transmit the command and to display the predetermined format display data. Therefore, the load applied to the memory amount and the processing rate of the information terminal can be reduced. Furthermore, a circuit scale can be reduced. The portability is not lost, and a comfortable usage environment can be provided.

(8) A radio network information indicative of the available interactive radio network in the corresponding service area is transmitted by the means for transmitting the large amount data. Therefore, even if the information terminal is moved to a different service area (a different interactive radio network or different means for transmitting the large amount data), an appropriate system can be selected, and the information terminal can be moved over the wide range.

(9) An identification code for specifying the information terminal is added to the large amount data transmitted by the means for transmitting the large amount data. Therefore, the information terminal can receive only the large amount data related to the information terminal. The leakage of the information can be prevented, and the charged service can be realized.

(10) The means for transmitting the large amount data comprises a plurality of directional antennas having the directivity in different directions. Furthermore, the information terminal supplies the position information indicative of the present position to the means for transmitting the large amount data via the interactive radio network and the asymmetric router at a predetermined timing. Therefore, a number of data can be simultaneously transmitted to a plurality of information terminals with the same frequency. Furthermore, the radio wave resource can be effective used, and a transmitting efficiency can be improved.

Additional advantages and modifications will readily occur to those skilled in the art. Therefore, the present invention in its broader aspects is not limited to the specific details, representative devices, and illustrated examples shown and described herein. Therefore, various modifications may be made without departing from the spirit or scope of the general inventive concept as defined by the appended claims and their equivalents.

We claim:

1. A data communication system comprising:

an interactive communication system in which data is transmitted/received between a host server and a terminal;

a large amount data transmitting system for unidirectionally transmitting a large amount of data from the host server to said terminal; and a data supplying apparatus for supplying data to be transmitted to said terminal to said interactive communication system when an amount of the data is less than a predetermined amount, and for supplying the data to be transmitted to said terminal to said large amount data transmitting system when the amount of the data is larger than the preset amount;

wherein said large amount data transmitting system comprises:

(i) storage means for temporarily storing large amount data supplied by the data supplying apparatus;

(ii) a timer for determining a scheduled transmission timing; and (iii) transmitting means for transmitting the large amount data stored in said storage means to the terminal at the scheduled transmission timing.

2. The communication system according to claim 1, wherein said transmitting means of said large amount data transmitting system comprises a broadcasting system for broadcasting a television signal, and means for superimposing the large amount data to be transmitted to said terminal on said television signal so that the large amount data is broadcasted to the terminal.

3. The communication system according to claim 1, wherein:

said large amount data transmitting system further comprises means for supplying data indicating the scheduled transmission timing to said terminal via said interactive communication system; and said terminal comprises means for receiving the data indicating the scheduled transmission timing, and means for turning on a receiving circuit at the scheduled transmission timing so that the terminal may receive the large amount data transmitted by said large amount data transmitting system.

4. The communication system according to claim 1, wherein:

said large amount data transmitting system comprises a plurality of data transmitting devices which are located in respective predetermined areas; and said data supplying apparatus comprises means for detecting a position of the terminal and means for supplying the data to be transmitted to the terminal to a data transmitting device located in an area corresponding to the position of said terminal.

5. The communication system according to claim 1, wherein:

said data supplying apparatus performs a predetermined encryption using a predetermined encrypting key relative-to the large amount data supplied to said large amount data transmitting system; and said terminal includes means for decrypting encrypted large amount data transmitted by said large amount data transmitting system using the predetermined encrypting key.

6. The communication system according to claim 5, wherein said terminal obtains the predetermined encryption key via said interactive communication system prior to a reception of the encrypted large amount data.

7. The communication system according to claim 1, wherein said interactive communication system and said terminal perform a predetermined encryption using a predetermined encrypting key relative to small amount data to be transmitted/received, and the encrypted small amount data is decrypted using the predetermined encrypting key.

8. The communication system according to claim 1, wherein:

said host server comprises a plurality of internet servers for providing an HTML formatted file; and said data supplying apparatus browses the HTML formatted file provided by a predetermined internet server according to a command supplied from said terminal via said interactive communication system, and converts the HTML formatted file into display format data which is transmitted to said large amount data transmitting system.

9. The communication system according to claim 4, wherein:

said large amount data transmitting system transmits communication information indicating a type of interactive communication device which can be used in each area by said terminal; and said terminal selects a specific interactive communication device to be used according to the communication information transmitted by said large amount data transmitting system.

10. The communication system according to claim 1, wherein:

said large amount data transmitting system transmits an identification code for specifying the terminal to receive the large amount data; and said terminal determines whether or not the identification code provided by said large amount data transmitting system corresponds to a preset identification code of the terminal, and enables the large amount data to be received only if a correspondence is detected.

11. The communication system according to claim 1, wherein:

said terminal supplies position information indicative of a present position of the terminal to said interactive communication system at a predetermined timing;

said data supplying apparatus transmits the position information via said interactive communication system to said large amount data transmitting system; and said large amount data transmitting system comprises a plurality of transmitting antennas each having a different directivity, so that the large amount data may be selectively transmitted from a given one of the data transmission antennas having a directivity corresponding to said position information.

12. The communication system according to claim 1, wherein said interactive communication system comprises a base station connected to the terminal via a radio channel and a wired network connected between the base station and the host server.

13. The communication system according to claim 1, wherein said interactive communication system comprises means for transmitting a data request from the terminal to the host server.

* * * * *